Oct. 19, 1926.
T. J. CARTER
1,603,514
DRIFTING VALVE
Filed Sept. 5, 1922
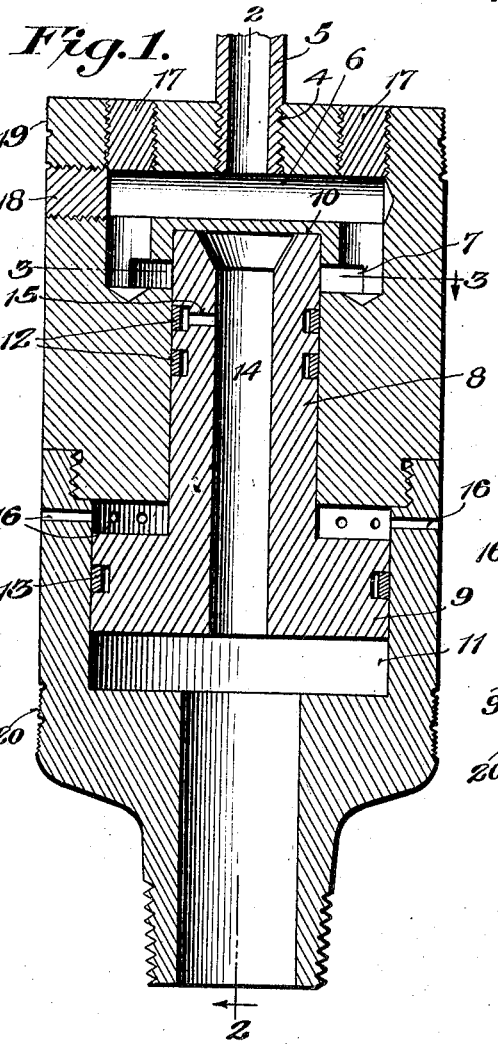
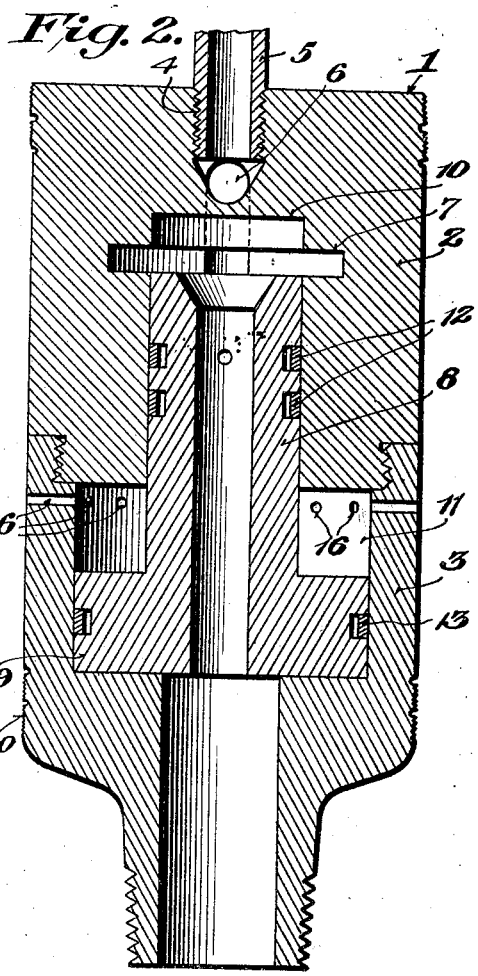
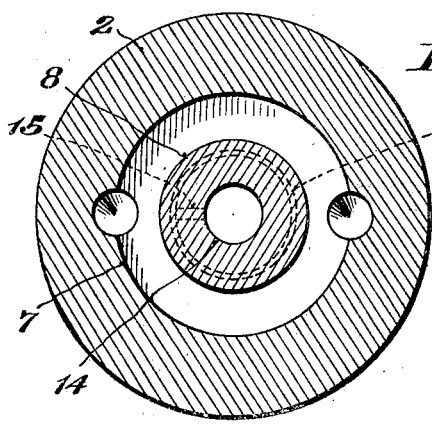
Inventor
Thomas J. Carter, Patented Oct. 19, 1926.

1,603,514

UNITED STATES PATENT OFFICE.

THOMAS J. CARTER, OF FLORENCE, SOUTH CAROLINA.

DRIFTING VALVE.

Application filed September 5, 1922. Serial No. 586,237.

My invention relates to valves of the character usually referred to as drifting valves as used particularly on locomotive engines.

The use by modern locomotives of superheated steam renders necessary keeping the cylinders at a safe temperature and moist when the throttle of the engine is closed, for if they are not kept in this condition they may be injured and the packing may be destroyed. My invention relates to an automatic, efficient, inexpensive and simple device for admitting the necessary small amount of saturated steam to the cylinders while the engine is running with the throttle closed.

With these and other objects in view, I have illustrated a device to carry out my idea in the accompanying drawings, in which:—

Figure 1 is a vertical section of the device with the movable parts in closed position;

Figure 2 is a vertical section of the device turned 90 degrees from the position shown in Figure 1 and with moving parts in operative position; and Figure 3 is a section on line 3—3 of Figure 1.

My valve, indicated as a whole by 1, has an upper casing 2 and a lower casing 3. This valve may be inserted in the steam chest of a locomotive in any desirable way as by screw-threading it therein. At the top of the upper casing is an opening 4 in which a pipe 5 is screw-threaded, this pipe leading to a source of saturated steam. Extending from the bottom of the opening 4 is a conduit or opening 6 leading to an annular chamber 7. The valve member consists of a stem portion 8 and a disc portion 9. The stem of the valve member seats when not in operation in a depression or shoulder 10 in the top of the upper casing. The disc reciprocates in an annular chamber 11 in the upper part of the lower casing 3. Packing rings 12 of any desired number, two being shown, are placed around the valve stem, their function being two-fold; that is, to prevent by friction the stem from dropping when pressure is removed from the bottom of the disc and also to make a tight fit in the opening between the upper and lower annular chambers of the respective casings. The disc may have one or more packing rings 13, one being shown. The valve stem and disc have an opening 14 extending throughout the length of the stem and disc, the purpose of this opening being to admit the saturated steam into the steam chest and cylinders when the throttle is closed and the valve is in operative or lowered position. The valve stem is lubricated by means of an opening 15 from the opening 14 to the bottom of one of the packing ring grooves, through which the steam from the cylinder, which carries a small amount of oil and oil vapor as is usual, will enter and be fed to the packing rings. The oil will work around the rings and lubricate the outer surface of the valve stem. Vents 16 are placed around the circumference of the lower casing for the purpose of allowing condensed steam to escape which may collect in the space from which these vents lead; to act as an indicator to show that the valve is working; to prevent carbonizing of the lubricating oil mixed with the steam and to act as a vacuum breaker for the valve. The plugs 17 are used to close the openings made at the top of the valve to form the vertical parts of the conduit 6. The plug 18 is to close the opening used to make the horizontal part of the conduit 6. These plugs 17 and 18 may be screw-threaded into the casing. The top of the upper casing may be scored as indicated at 19, and the bottom of the lower casing as indicated at 20.

The operation of my device will be understood from the description which has been given and may be briefly stated as follows:

When the throttle is open the steam in the cylinders will keep the valve closed due to the pressure on the bottom of the disc 9. When the throttle is closed and the engine is running, the pumping of the piston in the cylinder will produce a suction or partial vacuum in the cylinders. This suction will cause the valve member to be pulled down against the friction of the packing rings until it seats in the bottom of the annular chamber in the lower casing. When the stem of the valve has passed the bottom of the shoulder 10, steam will pass through the pipe 5, conduit 6 and annular chamber 7 through the valve opening 14 into the steam chest. This steam containing a small amount of oil as is usual will keep the cylinders lubricated. The vents 16 above the top of the valve disc produce an efficient action of the valve as has been stated.

Having described my invention, what I claim as new and desire to protect by Letters Patent is:

1. A drifting valve comprising a casing having upper and lower chambers therein, a connection between said upper chamber and a source of saturated steam, a connection between said lower chamber and a cylinder of a locomotive, a connection between said chambers, a hollow valve stem adapted to reciprocate in said connection between said chambers and having at the bottom thereof a disc adapted to reciprocate in said lower chamber, said casing having a seat in the part above said upper chamber for the end of the valve stem when the valve is in closed position, said casing having openings from the upper part of said lower chamber, and said valve stem having an opening therein extending to the surface of said valve stem whereby the outer surface of said valve stem is lubricated.

2. A device of the kind described comprising a casing having upper and lower chambers therein and an opening between said chambers, a hollow valve member in said opening having a stem adapted to project into said upper chamber, said casing having a seat in the upper wall thereof adapted to receive the end of the stem of the said valve member whereby steam pressure is prevented from acting on said valve stem, said valve stem having an opening from the hollow opening therein extending to the surface thereof whereby the outer surface of said valve stem is lubricated.

3. A device of the character described comprising a casing having upper and lower chambers therein and an opening between said chambers, said lower opening having connection with a cylinder of a locomotive, a hollow valve member in said opening between the chambers, there being packing grooves in said valve member, packing rings in said grooves, said valve stem having an opening connecting the hollow opening therein with the packing groove whereby steam carrying oil or oil vapor will enter said packing groove, and the oil will work around the packing ring and lubricate the outer surface of the valve stem.

In testimony whereof I affix my signature.

THOMAS J. CARTER.